United States Patent Office 3,435,513
Patented Apr. 1, 1969

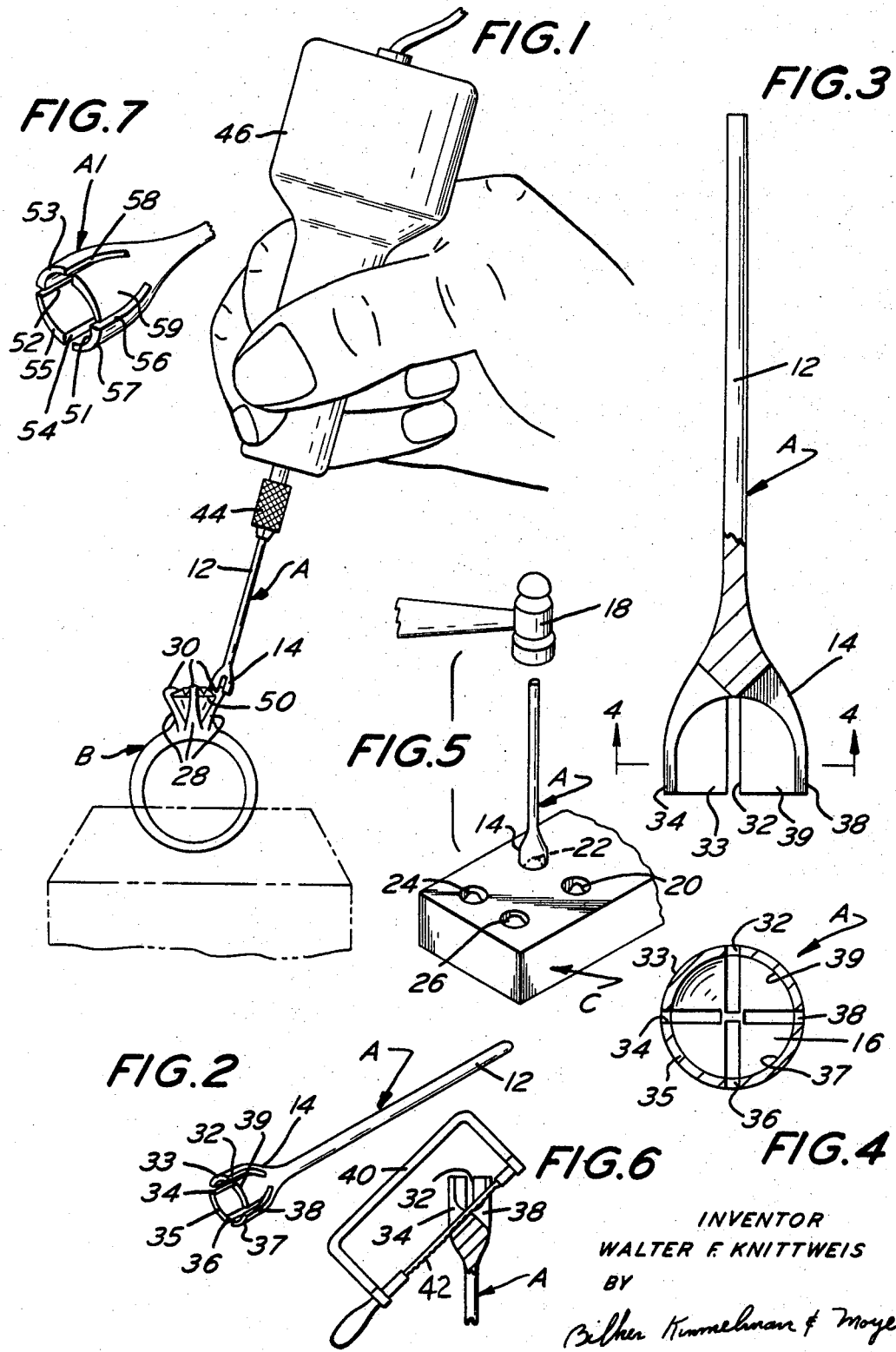

3,435,513
BEAD CUTTER FOR GEM SETTINGS
Walter F. Knittweis, 3122 Knorr St.,
Philadelphia, Pa. 19149
Filed Oct. 4, 1966, Ser. No. 584,164
Int. Cl. B26d *1/12;* B23p *5/00;* B24b *39/00*
U.S. Cl. 29—567                            8 Claims

ABSTRACT OF THE DISCLOSURE

A burnishing tool for forming beads at the ends of prongs of gem settings wherein a hardened arcuately-cupped surface is co-axially disposed with a rotatable shank and narrow slots are circumferentially disposed in the cupped surface to divide the same into a plurality of regularly spaced segments and act as reliefs for metal being cut.

---

This invention relates to tools used in setting gems within mountings, and more particularly relates to cutting tools which are utilized in forming beads at the ends of the prongs holding the stones in place within their precious metal mountings.

When a gem is set within a ring, brooch or other mounting, the stone may be held by small prongs which are pushed over the edges of the jewel so as to hold the gem securely in place. These settings or mountings may be cast, die struck or even hand made of one of the precious metals such as yellow gold, white gold, platinum and palladium. The prongs which are upset over the crown of the gem are, however, usually rather coarse and irregular in their original condition. As a consequence, it is usually desirable and necessary to form a smooth spherically shaped bead at the very ends of the prongs to prevent their catching upon the threads or nap of delicate fabric. In addition, the exposed surface of the prongs which overlie the stones must not detract from the brilliance thereof, but should augment the reflective quality and beauty of the gems themselves.

In the past, while the diamond setter could employ a rotary tool having a cupped end for cutting beads on the surface of relatively soft prongs, such as platinum, a plain spherically concave cup was completely unsatisfactory for very soft palladium or for relatively hard settings such as yellow or white gold. Internally serrated or burred cup tools could not be employed on any of the precious metal beading operations because of the rapidity in which the interstices became clogged with the dust or cuttings, even before completion of a single bead. Accordingly, the diamond setter or bead cutter was required, in most cases, to resort either to primitive filing tools which he painstakingly reciprocated and manipulated over the surface of palladium, and yellow or white gold pronged settings until the bead was formed, or to utilize the rotary serrated cup tools and repeatedly cleanse them of the metal cuttings and filings as they became clogged. Recognizing that the number of prongs for holding a single stone may vary from four, in a square setting, to six in a Tiffany setting, it is readily apparent that the bead forming operations on multiple gem settings of palladium, yellow gold and white gold are extremely time consuming and expensive.

It is therefore an object of this invention to provide a rotary bead cutting tool which may be universally used on all precious metal settings.

Another object of this invention is to provide a rotary tool for beading hundreds of prongs successively and rapidly without clogging of the tool or tearing the metal away from the prong itself.

Still another object of this invention is to provide a rotary beading tool which will not tear soft metals, such as palladium.

Yet another object of this invention is to provide a universal beading tool which can easily be made by conventional methods known to the gem setter.

A still further object of this invention is to provide a method for fabricating a gem setter's bead cutting tool.

Other objects of this invention are to provide an improved device and method of the character described which is easily and economically produced, sturdy in construction and highly efficient and effective in operation.

With the above and related objects in view, this invention consists of the details of construction and combination of parts as will be more fully understood from the following detailed description when read in conjunction with the accompanying, in which:

FIGURE 1 is a perspective view of a gem setting whose prongs are being formed by a rotary bead cutting tool embodying this invention.

FIGURE 2 is a perspective view of the bead cutter alone.

FIGURE 3 is a partial sectional view thereof.

FIGURE 4 is a sectional view taken along lines 4—4 of FIGURE 3.

FIGURE 5 is a perspective view showing the step of coining the beading cup within the tool by means of a punching die.

FIGURE 6 is an elevational view, and partly in section, of the last step in the method for fabricating the instant bead cutting tool.

FIGURE 7 is a fragmentary perspective view of a modified form of the bead cutter.

Referring now in greater detail to the drawing in which similar reference characters refer to similar parts, I show a bead cutting tool, generally designated as A, for forming the ends of prongs in gem setting, generally designated as B.

The tool A comprises an elongated shank 12 having a bulbous cupped portion 14 at one end thereof. The interior of the cupped portion 14 includes a generally hemispherical concave surface 16 which is coin-punched therein by striking with a hammer 18 against the appropriate sized spheroidal knobs 20, 22, 24 or 26, in coining die C. The process of coining the spherical surface 16 is conventional and is generally set forth in FIGURE 5. The knobs 20, 22, 24, or 26 of die C is so selected to be identical in size to conform with that of the ultimate bead 30 which is to be formed at the end of the prongs 28 in setting B.

After the coined spherical surface 16 is formed in the tool A, relief slots 32, 34, 36 and 38 are cut through each of the four quadrants of the cup 14, as shown in FIGURE 6, by means of an appropriate cutting device, such as a jeweler's saw 40 employing a wire rasp blade or diamond grit wire 42. It has been found that two to eight of the slots has proven satisfactory although the four slots 32, 34, 36, and 38 oriented at right angles yields efficient results and are incorporated in the cup 14 with ease and simplicity. The depth of the slots 32, 34, 36, and 38 extend to the apex of the spherical surface 16 and are raked back therefrom at approximately a 45° angle while the width of the slots may vary from one tenth to one-quarter the cup diameter. The leading edges of the segments 33, 35, 37 and 39 defined intermediate the slots act as teeth for efficiently removing chips of relatively hard yellow and white gold metals while the slots 32, 34, 36 and 38 themselves act as reliefs for ejecting the chips being removed as they are cut.

It has been found, in practice, that the slots 32, 34, 36 and 38 should be cut to within a few thousandths of an inch of the very crown or pole of the spherical surface 16 in order to prevent undue flattening or oblation of the bead 30 being cut, or conversely, to preclude the formation of a nodule at the end thereof. Preferably, one thousandths of an inch of metal should still remain at the pole of the concave surface 16 after the slots are cut. As shown in FIGURE 4, the inboard edges of the slots 32 and 36 do not quite meet. The spacing between the roots of the slots is effected easily by inclining the angle of the saw blade 42 approximately 45° to the axis of the shank 12, as shown in FIGURE 6. The relief formed by the slot's rake angle at the periphery of the cup 14 provides for a most efficient clearing and ejection of metal chips being cut.

Referring now to FIGURE 1, the shank 12 of tool A is inserted within a chuck 44 of a rotary motor 46, which is operated at a speed of from approximately 60 to 200 r.p.m. The prongs 28 have already been upset about the crown or bezel of jewel 50, a Tiffany type setting being illustrated. The particular size of cup 16 is selected to produce a bead 30 appropriate to the size of the gem 50 mounted within the prongs 28. The concave cup 16 on the rotating tool A is touched down upon the head or terminal end of each of the prongs 28 whereupon the bead 30 will be formed almost immediately as a result of metal being cut or shaved therefrom. There will be no tearing of the metal where soft metal, such as palladium, is used in the settings. The shaved metal chips from the prongs will be removed and ejected through the relief slots 32, 34, and 36 and 38 without clogging the cup 16 so that the segmental teeth 33, 35, 37 and 39 are constantly available to shave metal and produce a smooth polished spherical bead, regardless of the precious metal used in the setting. It is preferable that the bead cutter itself by of a good hard grade steel although almost any composition or substance appreciably harder than the metal used in the setting and having good abrasion resistant properties is suitable.

In FIGURE 7, there is shown a modified bead cutter A1 which includes an aspherical cup 51 having petaloid segments 53, 55, 57 and 59. Relief slots 52, 54, 56 and 58 space the various segments from each other. The concave surface of each segment may be a spherical section in itself. However, the concave leading edge of each segment 53, 55, 57 and 59 is interiorly advanced slightly beyond the trailing edge of the next adjacent segment in the direction of tool rotation, counterclockwise as shown in FIGURE 7. In this manner, the leading edges of the respective segments in tool A1 act as serrated edges for even more efficient and rapid removal of metal than in bead cutter A. Again, the slots 52, 54, 56 and 58 are raked back toward the outer periphery of the cup 51.

Although this invention has been described in considerable detail, such description is intended as being illustrative rather than limitng, since the invention may be variously embodied, and the scope of the invention is to be determined as claimed.

What is claimed is:
1. A bead cutter for forming beads at the ends of prongs in a setting for gems comprising a rotatable shank, a cupped portion of one end of the shank including an arcuately concave hardened surface in co-axial symmetrically disposed relation with said shank, and circumferentially spaced slots in said cupped portion radially extending through said arcuate surface and dividing the same into a plurality of regularly spaced segments, the combined width of the slots being between one-tenth and one-quarter the cup circumferential diameter.
2. The invention of claim 1 wherein said surface is substantially hemispherical in configuration.
3. The invention of claim 2 wherein said slots are disposed in each of the quadrants.
4. The invention of claim 2 wherein said slots extend to within a few thousandths of an inch of the polar crown of said hemispherical surface.
5. The invention of claim 1 wherein said cup portion is coined therein.
6. The invention of claim 1 including means to support and rotate said shank between 60 and 200 r.p.m.
7. The invention of claim 4 wherein the base of said slots are raked back toward the periphery of said cupped portion.
8. The invention of claim 1 wherein the arcuate surface of each of said segments is a spherical section, and the leading edge of the concave surface of each segment extends slightly interiorly in advance of the trailing edge of the next adjacent segment.

References Cited

UNITED STATES PATENTS

| 834,457 | 10/1906 | Culman | 29—103 |
| 1,452,817 | 4/1923 | Retterath | 29—103 X |
| 2,126,476 | 8/1938 | Koonz | 29—103 |

FOREIGN PATENTS 499,733  11/1919  France.

HARRISON L. HINSON, *Primary Examiner.*

U.S. Cl. X.R.

29—10, 90, 95, 103; 90—11